Nov. 24, 1925. 1,562,760
G. D. HARRIS
ART OF TREATING LIQUID MATERIALS
Filed Oct. 23, 1920
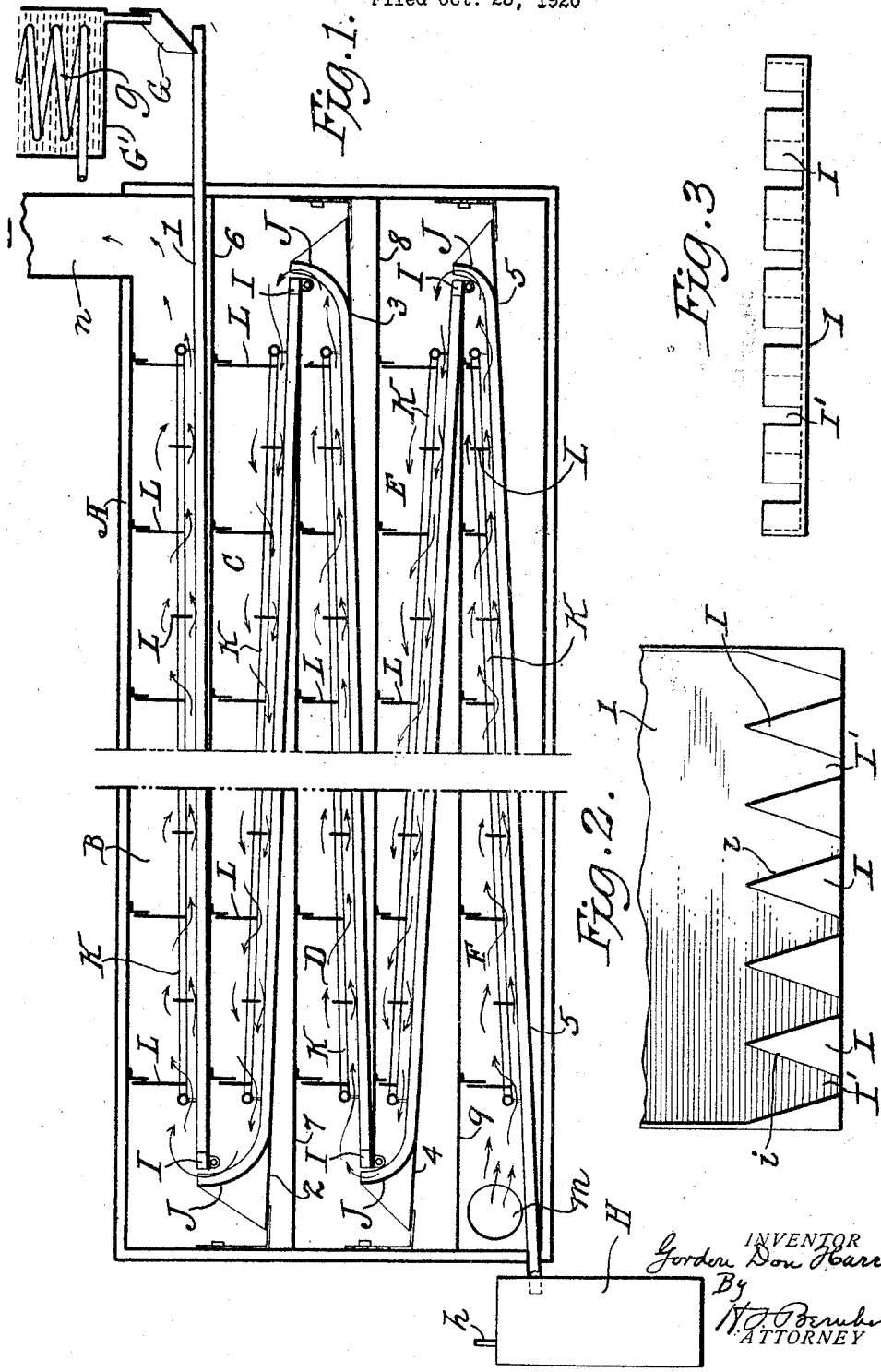

Patented Nov. 24, 1925.

1,562,760

UNITED STATES PATENT OFFICE.

GORDON DON HARRIS, OF ISLIP, NEW YORK, ASSIGNOR, BY MESNE ASSIGNMENTS, TO THE INDUSTRIAL DRYER CORPORATION, OF STAMFORD, CONNECTICUT, A CORPORATION OF CONNECTICUT.

ART OF TREATING LIQUID MATERIALS.

Application filed October 23, 1920. Serial No. 419,053.

*To all whom it may concern:*

Be it known that I, GORDON DON HARRIS, a citizen of the United States, residing at Islip, county of Suffolk, and State of New York, have invented a certain new and useful Art of Treating Liquid Materials, of which the following is a specification.

This invention pertains to the art of treating liquid materials, and is directed, more particularly, to means for concentrating and pasteurizing such liquids as milk, although it will be understood that said invention is not restricted to the treatment of milk alone, for the reason that the principle of the invention or the apparatus to be hereinafter described may be utilized in the evaporation or desiccation of other liquid or semi-liquid materials, such as eggs, blood, etc.

In the art of treating materials which are subject to rapid deterioration under atmospheric and other influences, such as milk and more especially whole milk, with a view to the ultimate production of a dry powder, experience shows that the evaporation of the aqueous content can be successfully attained by the observance of conditions which involve a minimum physical disturbance of the constituents of the material and under thermal conditions which tend to destroy, or at least neutralize, the bacteria that are productive of further and deleterious changes in the composition of said material.

Accordingly, my invention consists in a mode of treatment whereby liquid materials, such as milk, are concentrated and pasteurized, it being preferred to flow the liquid material under conditions which tranquilize such flow so as to involve minimum physical disturbance of the constituents of said material and concurrently with such flow to heat said material to a temperature which effects pasteurization, and also to expose said material to the evaporating action of a drying atmosphere which circulates into contact with the material in a manner to exchange heat for moisture, as a result of which the aqueous contents of the fluid material is evaporated and the residue of such material is concentrated, the resulting product being of a semi-liquid character substantially free from the aqueous constituent and susceptible of subsequent treatment for the production of dry powder.

In a preferred form of apparatus, I employ a plurality of inclined surfaces, such as pans, over which the liquid material is free to flow by gravity and upon which surfaces said liquid material is distributed in a relatively thin film. The rate of flow of the liquid material upon the surfaces of the pans is controlled by the angle of inclination of each pan; but as the speed of the material is reduced when flowing over the successive pans due to a progressive concentration which the liquid material undergoes by the evaporation of the aqueous content therein, it becomes desirable to position the second, third and successive pans at increasingly greater angles of inclination, in order that said fluid undergoing concentration progressively will travel by gravity at the desired speed upon the several pans.

Cooperating with the inclined flow pans are baffles positioned in approximately parallel relation to said pans and forming therewith flow channels through which circulates a drying atmosphere adapted for contact with the film of liquid material, the flow of the drying atmosphere being in a reverse direction to the flow of the liquid material. Said drying atmosphere is usually preheated to a temperature suited to the particular material to be evaporated, and when treating milk, the temperature is such that the desired exchange of heat for moisture takes place and at the same time the liquid material (milk) is heated to the temperature required for pasteurizing the milk. The exchange of heat for moisture under ordinary evaporating conditions reduces the temperature of the drying agent, but this tendency to temperature reduction is overcome by the provision of heating coils and baffles within the flow channels analogous in some respects to the system of air heating during circulation disclosed in the United States patent to Wright, 1,251,317 of December 25, 1917.

In the operation of concentrating and pasteurizing such fluid materials as milk, it is desirable that the flow of the milk in a thin film over the pans and the flow from pan to another of the series shall take place with the least physical disturbance or agitation of the constituents of the milk. These ends are attained in the first instance by the angle of inclination given to the pans; in the second instance by the provision of spill-ways at the delivery end of each pan, and in the third instance by a splash guard intermediate the delivery end of one pan and the receiving end of the next pan in the series; the several elements operating to establish and maintain a tranquil flow of the liquid material over the pans and from one pan to the other while at the same time said parts occupy such relation to the flow channels that the drying atmosphere is free to circulate over the pans and through the spill-ways for the required contact with the fluid or semi-fluid material.

Other functions and advantages of the invention will appear from the following description taken in connection with the drawings, wherein:—

Figure 1 is a vertical section, partly in elevation, through the apparatus for drying liquid materials in accordance with this invention.

Figure 2 is plan view on an enlarged scale of the delivery end portion of one of the flow pans illustrating the channels adapted to produce spill-ways for the flow of material, and Figure 3 is an end view of one of the pans looking at the spill-ways shown in Figure 2.

Within a casing or housing A is a plurality of flow pans, five being shown and designated by the numerals 1, 2, 3, 4 and 5, although it will be understood that the number of flow pans is not material, and, further, that said number of pans may be increased or decreased according to the length of time required to evaporate the aqueous contents of the liquid material.

Cooperating with the flow pans and extending longitudinally within the housing or casing is a series of baffles or partitions 6, 7, 8 and 9, the baffles or partitions 6 and 8 extending from one end wall of the housing toward the other end thereof, and being positioned below the flow pans 1 and 3 respectively, whereas the baffles or partitions 7 and 9 extend from the opposite end wall of the housing nearly to the first named end and said baffles or partitions 7 and 9 being arranged below the flow pans 2 and 4 respectively. It will be understood that the baffles or partitions 6, 7, 8 and 9 alternate with the flow pans 1, 2, 3 and 4 so as to produce flow channels B, C, D, E, F extending logitudinally within the housing or casing, one end of each flow channel opening into a corresponding end of the next flow channel so that the drying atmosphere is directed in a circuitous path within the housing. The series of pans extend within the flow channels, in order to expose the film of liquid material to the direct action of the drying atmosphere which circulates within said flow channels.

In this invention it is essential that each flow pan be inclined within its respective flow channel, but the angle of inclination of the the pans varies. The flow pan 1 extending within flow channel B is inclined at such an angle that the liquid material is free to flow over the surface of the pan at a rate of speed controlled in a large measure by the angle of inclination of the pan, and during the exposure of the film upon the first flow pan 1 to the action of the drying atmosphere some of the aqueous content of the liquid material is evaporated, as a result of which the liquid material on the flow pan 1 is concentrated to a certain degree.

The flow pan 2 is positioned below the flow pan 1 and is inclined in a reverse direction to the inclination of said pan 1, the angle of inclination of the flow pan 2 being somewhat greater than the angle of inclination of flow pan 1. The delivery end of flow pan 1 overhangs the receiving end of the next flow pan 2, and the liquid material partly concentrated on flow pan 1 is free to flow upon the receiving end of pan 2, the flowing material being diffused over the surface of pan 2 and flowing toward the lower end of the pan at a rate which is governed by the partial concentration of the liquid material and the angle of inclination of said pan 2.

In like manner the next flow pan 3 is positioned below pan 2 and inclined in the opposite direction to the inclination of pan 2, the receiving end of pan 3 extending beyond the delivery end of pan 2 in order that the liquid material may flow from pan 2 upon the flow pan 3.

Similarly, flow pan 4 is positioned below pan 3 and is inclined in an opposite direction thereto, but the angle of inclination of flow pan 4 is greater than the angle of pan 3, the receiving end of pan 4 extending beyond the delivery end of pan 3. Pans 2 and 4 are inclined in the same general direction, but the angle of inclination of pan 4 is greater than the angle of inclination of pans 2 and 3. Furthermore, pan 5 is below pan 4 and is inclined in an opposite direction to the inclination of pan 4, and at a greater angle than said pan 4, the receiving end of pan 5 being below the delivery end of pan 4.

As shown in Figure 1 the receiving end of the first pan (1) extends beyond the housing A in order that the liquid material in the required volume and at the desired temperature may be fed or supplied by suitable means directly to pan 1. A feed means for the liquid material is shown as a chute G connected with a tank G' within which is a heating coil $g$ whereby the liquid material is adapted to be preheated to the temperature necessary to carry on the pasteurization of said liquid material. It will be understood, however, that any desired means for preheating the liquid material and feeding said liquid material to the receiving end of said flow pan may be substituted for the feeding and heating means illustrated diagrammatically in Figure 1.

The delivery end of the final flow pan (5) extends beyond the housing at the lower part thereof and adjacent to said delivery end of the final pan is a receiving tank H, the latter being provided with a suitable air vent $h$ whereby the semi-liquid material from the final flow pan (5) is discharged within the storage tank H until it is desired to subject the said material to further treatment in a manner to ultimately produce a dry powder.

According to this invention the liquid material is free to flow by gravity over the surfaces of the successive pans and at a speed which, while assuring a gravity flow, will avoid an undue physical disturbance of the constituents composing the material. In order to tranquilize the flow of the liquid material when delivered from one end of one pan to the corresponding end of the pan next below it, I find it desirable to provide each pan at its delivery end with spillways of the character shown in Figures 2 and 3, and in addition thereto to employ splash guards, as shown in Figure 1. The end of each pan is provided with a plurality of upstanding projections I, the sides of which are inclined as at $i$, and these projections are spaced with respect to each other to produce intervening passages I' constituting the spill-ways. The projections are in the path of the flowing material for the purpose of dividing said material so that the liquid material passes through the spill-ways in relatively narrow streams.

Positioned intermediate the delivery end of each pan and the receiving end of the pan next below it is a member J serving the function of a splash guard, upon which the liquid material flowing in streams from the spill-ways of one pan is deposited so that the splash guard conducts the liquid material to the pan next below in a manner to tranquilize the flow of the liquid material. The splash guard is preferably curved in order that the liquid material may flow with the minimum of disturbance of the constitutents of the material, and these splash guards are spaced with respect to the two pans so that the drying atmosphere will circulate freely from one flow channel into the next flow channel, the splash guard offering the minimum of resistance or obstruction to the circulation of the drying atmosphere.

Positioned within each flow channel is a heater K shown in the drawings as a coil of pipe to which is supplied by suitable means a heating agent such as steam, water, or other heating agent. The heating coil extends within the flow channel longitudinally thereof, and said heating coil occupies a substantially parallel relation to the surface of the flow pan extending within the flow channel. The heating coil is spaced relatively to the flow pan with which it is associated, and with this coil cooperates transverse baffles L. The baffles are in series within each flow channel transversely thereto, and transversely also to the plane of the heating coil and the flow pan. The baffles occupy such relation to the heating coil and to the flow channel that the drying atmosphere circulating within said channel is deflected from a straight path over the flow pan, certain of the baffles acting to divert the drying atmosphere toward the surface of the pan and the film thereon, whereas other baffles divert the drying atmosphere with respect to the heating coil, as a result of which the course of the drying atmosphere is so changed that in its flow over the pan the air comes into contact with the film of material and with the heating coil. The coils are of such capacity that they radiate the heat required to maintain the drying atmosphere required at a desired temperature, notwithstanding the exchange of heat for moisture, and said heaters act also to heat the film of liquid material upon the flow pans so as to maintain constant the liquid material at the temperature required to effect pasteurization.

The drying atmosphere is preheated to the desired temperature and blown at the desired speed and volume into the housing A, the inlet $m$ for the drying atmosphere being adjacent the delivery end of the last flow pan of the series, see Figure 1, whereas the outlet for the drying atmosphere is at the upper corner of the housing, said outlet being in the form of a stack or uptake $n$.

The operation is as follows: The blower is set into operation for forcing the drying atmosphere through the inlet and above the delivery end of the final flow pan (5), and liquid material is preheated in the tank G' to the desired temperature, the material flowing through the chute G upon the receiving end of the first flow pan 1. The liquid is distributed or diffused over the surface of the flow pan 1 in the form of a thin film and flows by gravity over said surface owing to the inclination of the first pan, the liquid being divided into streams through the spill-ways I' and flowing thence upon the splash guard J, by which the liquid is distributed to the receiving end of flow pan 2. The liquid flows successively from one pan to the next, the material being diffused or distributed over each pan in the form of a film, and during the period of the flow of the liquid material over the successive pans, the drying atmosphere is blown through the channels, the direction of the circulation of the drying atmosphere being contrary to the flow of the liquid material over the surfaces of the pans. The circulation of the drying atmosphere in each channel is diverted by the baffles L with respect to the plane of the pan and the heating coil, the drying atmosphere being directed into contact with the film of material upon the pan and into contact also with the heating coil. The flow of the drying atmosphere over the material exchanges heat for moisture, thus evaporating the aqueous content of the material and heating the film of material to the temperature necessary for effecting pasteurization, it being important when drying certain liquid materials to maintain constant temperature of the material. The continued flow of material in film like condition over the successive flow pans, and the continued circulation of the drying atmosphere into contact with the material operates by the evaporation of moisture to concentrate the liquid material while maintaining the same at the desired temperature for pasteurization, as a result of which the liquid material is so concentrated that it attains a thick consistency by the time the material flows from the delivery end of the final flow pan (5) into the tank H, whence the liquid material may at a subsequent period be subjected to additional treatment in order to ultimately produce a dry powder.

Having thus described the invention, what I claim as new and desire to secure by Letters Patent is:

1. In the art of treating liquid materials, the improvement which consists in concentrating the liquid material by flowing the same by gravity and in the form of a film into contact with a succession of inclined surfaces over which the gravity flow of the liquid material is tranquilized, and concurrently with the gravity flow of such film heating the liquid material and exposing the same to the action of a drying atmosphere.

2. In the art of treating milk, the improvement which consists in concentrating and pasteurizing the milk by diffusing and flowing the same by gravity and in the form of a film into contact with a succession of inclined surfaces over which the gravity flow of the milk is tranquilized, and concurrently with the flow heating the milk to a temperature for effecting the pasteurization and exposing the heated milk film to the action of a drying atmosphere circulated into contact with the milk film.

3. In the art of treating milk, the process which consists in diffusing milk in the form of a film and flowing the same into contact with a succession of inclined surfaces, heating the milk film to a temperature for effecting pasteurization and concurrently with the flow of the milk in a film-like condition exposing the film to the action of a drying atmosphere whereby the milk is concentrated by the evaporation of the aqueous constituent and such concentration and pasteurization are performed simultaneously.

4. In the art of treating milk, the process which consists in flowing milk by gravity in the form of a film into contact with a succession of inclined surfaces over which the flow of such milk film is tranquilized, heating the milk during the period of its flow to a temperature which pasteurizes the same, and exposing said heated film while it is in motion to a drying atmosphere for evaporating the aqueous constituent of the milk, whereby the milk is concurrently pasteurized and concentrated.

5. In the art of treating milk, the process which consists in diffusing and flowing milk in the form of a film over surfaces the angles of inclination of which increase from the point of feed to the point of exit, heating the milk film during the period of its flow to a temperature which effects pasteurization of the milk, and exposing the milk film while in motion over said surfaces to a drying atmosphere for evaporating the aqueous content of the milk and concentrating the latter while undergoing pasteurization.

In testimony whereof I have signed my name hereto this 11th day of October, 1920.

GORDON DON HARRIS.